(12) United States Patent
Stitou et al.

(10) Patent No.: US 7,621,149 B2
(45) Date of Patent: Nov. 24, 2009

(54) METHOD FOR PRODUCING COLD AND INSTALLATION THEREFOR

(75) Inventors: Driss Stitou, St Nazaire (FR); Pierre Neveu, Villeneuve de la Raho (FR); Bernard Spinner, Perpignan (FR); Bruno Spinner, legal representative, Fabrèges (FR); Caroline Spinner Brossard, legal representative, Brassac (FR); Anne Christel Spinner Kohler, legal representative, Narbonne (FR); Camille Spinner, legal representative, Perpignan (FR); Martin Spinner, legal representative, Perpignan (FR)

(73) Assignees: Centre National de la Recherche, Paris (FR); Universite de Perpignan, Perpignan (FR)

( * ) Notice: Subject to any disclaimer, the term of this patent is extended or adjusted under 35 U.S.C. 154(b) by 294 days.

(21) Appl. No.: 10/521,760

(22) PCT Filed: Jul. 11, 2003

(86) PCT No.: PCT/FR03/02218

§ 371 (c)(1),
(2), (4) Date: Feb. 3, 2006

(87) PCT Pub. No.: WO2004/011860

PCT Pub. Date: Feb. 5, 2004

(65) Prior Publication Data
US 2006/0090476 A1 May 4, 2006

(30) Foreign Application Priority Data
Jul. 24, 2002 (FR) .................................. 02 09392

(51) Int. Cl.
*F25B 17/08* (2006.01)

(52) U.S. Cl. .......................................... 62/480; 62/494
(58) Field of Classification Search .................... 62/4, 62/101, 476, 480, 79, 112, 494, 393, 238.3; 422/142, 177, 190, 211; 502/400; 165/104.12
See application file for complete search history.

(56) References Cited

U.S. PATENT DOCUMENTS 3,044,861 A * 7/1962 Hasche ........................ 422/206
5,186,241 A 2/1993 Kunugi et al.

(Continued)

FOREIGN PATENT DOCUMENTS

EP 0 810 410 A1 12/1997

(Continued)

*Primary Examiner*—Mohammad M Ali
(74) *Attorney, Agent, or Firm*—Crowell & Moring

(57) ABSTRACT

The invention relates to refrigeration at $T_U$ by a reversible sorption system.

The method is implemented in an installation comprising an endothermic component (EC) and an exothermic component consisting of the reactors (1) and (2). The reactors (1) and (2) are in thermal contact, each of them constituting an active thermal mass for the other, and they are provided with heating means (6) and heat extraction means (5). (1), (2) and (EC) are provided with means for bringing them into selective communication, and reversible phenomena involving a gas G take place therein, the equilibrium curve for the phenomenon in (1) lying within a higher temperature range than that of the equilibrium curve for the phenomenon in (2), which is itself higher than that of the curve for the phenomenon in (EC) in the Clausius-Clapeyron plot.

11 Claims, 6 Drawing Sheets

U.S. PATENT DOCUMENTS

| | | | |
|---|---|---|---|
| 5,492,777 A * | 2/1996 | Isenberg et al. | 429/17 |
| 5,728,368 A * | 3/1998 | Bou et al. | 423/659 |
| 6,402,369 B1 * | 6/2002 | Ludington et al. | 374/13 |
| 6,553,771 B2 * | 4/2003 | Tsenter | 62/46.2 |
| 6,641,625 B1 * | 11/2003 | Clawson et al. | 48/127.9 |
| 6,811,913 B2 * | 11/2004 | Ruhl | 429/32 |
| 6,878,481 B2 * | 4/2005 | Bushong et al. | 429/54 |
| 7,108,730 B2 * | 9/2006 | Shah et al. | 48/203 |
| 7,288,229 B2 * | 10/2007 | Turner et al. | 422/130 |
| 2002/0058175 A1 * | 5/2002 | Ruhl | 429/32 |
| 2002/0066277 A1 * | 6/2002 | Tsenter | 62/46.2 |
| 2002/0155036 A1 * | 10/2002 | Hajduk et al. | 422/130 |

FOREIGN PATENT DOCUMENTS

| | | |
|---|---|---|
| FR | 2 615 601 | 11/1988 |
| WO | WO97/40328 A1 | 10/1997 |

* cited by examiner

METHOD FOR PRODUCING COLD AND INSTALLATION THEREFOR

BACKBROUND OF THE INVENTION

1. Field of the Invention

The invention relates to an installation and a method of refrigeration using a thermochemical system, especially for freezing various products or for producing chilled water.

2. Description of the Related Art

Heat generation or refrigeration installations based on a liquid/gas phase change or on reversible sorption between a gas, called the working gas, and a liquid or solid sorbent, are known. A reversible sorption may be an absorption of a gas by a liquid, an absorption of a gas on a solid, or a reaction between a gas and a solid. A reversible sorption between a sorbent S and a gas G is exothermic in the synthesis direction S+G→SG and is endothermic in the decomposition direction SG→S+G. In a liquid/gas phase change of the gas G, the condensation is exothermic and the evaporation is endothermic.

These reversible phenomena can be represented on a Clausius-Clapeyron plot by their equilibrium line:

$$InP = f(-1/T), \text{ more precisely } InP = -\frac{\Delta H}{RT} + \frac{\Delta S}{R},$$

P and T being the pressure and the temperature respectively, ΔH and ΔS being the enthalpy and the entropy of the phenomenon (decomposition, synthesis, evaporation, condensation), respectively, and R being the perfect gas constant.

The endothermic step may be advantageously employed in an installation of this type for freezing various products (especially water for obtaining ice) or for producing chilled water.

Various reactors and methods based on these principles have been disclosed.

EP 0 810 410 discloses a system comprising a reactor and an evaporator/condenser connected via a pipe provided with a valve. A thermochemical reaction or a solid/gas adsorption takes place in the reactor. The latter includes means for heating the solid that it contains and means for extracting the heat from the exothermic synthesis reaction, these means being formed either by a heat exchanger, or by increasing the thermal mass of the reactor. The reactor is designed in such a way that, with its content, it has a thermal mass sufficient to absorb the heat produced during the exothermic reaction. The method of managing this system consists in bringing the evaporator/condenser into communication with the reactor when the evaporator/condenser is filled with the working gas in liquid form, this having the effect of cooling the evaporator/condenser by evaporation, and then in turning on the means intended to heat the solid so as to deliver the working gas to the evaporator/condenser and to condense it therein. The means intended to heat the solid in the reactor are turned on before the previous step has been completed. The refrigeration produced by the evaporator/condenser can be used to produce chilled water or ice. However, in this system, the cycle times are relatively long because the regeneration of the system takes place at a high temperature $T_h$ and the cooling of the reactor takes place at ambient temperature $T_0$. Consequently, the reactor undergoes a relatively large thermal excursion between the regeneration temperature and the ambient temperature. This results in a low performance coefficient.

EP-0 835 414 discloses a method of refrigeration and/or heat production using thermochemical phenomena involving a gas G in an installation comprising two reactors ($R_1$, $R_2$) containing a respective salt ($S_1$, $S_2$), an evaporator for the gas G and a condenser for the gas G. The equilibrium temperature of the salt $S_1$ is below the equilibrium temperature of the salt $S_2$ at a given pressure. The reactors are placed in thermal contact so as to be able to exchange heat. The reactors, the evaporator and the condenser are brought selectively into communication with each other by means of pipes provided with valves. In the initial state, the reactors and the condenser are in communication, at the pressure of the condenser. During operation, one of the reactors is in synthesis mode while the other reactor is in decomposition mode. In this operation mode, refrigeration is achieved at a single temperature level, that is to say at the evaporation temperature in the evaporator.

The object of the present invention is to provide a method and an installation for achieving a very high refrigeration power per unit volume, for example around 200 kW/m³, with greatly reduced cycle times and higher performance levels, especially for instantaneous and rapid production of chilled water or for the fast freezing of various products (for example for the production of ice).

SUMMARY OF THE INVENTION

According to the present invention, the method of refrigeration using a thermochemical system comprises three reversible phenomena involving the gas G in three chambers (EC), (1) and (2), the respective equilibrium temperatures $T_{E(EC)}$, $T_{E(1)}$ and $T_{E(2)}$ at a given pressure being such that $T_{E(EC)} < T_{E(2)} < T_{E(1)}$, the chambers (1) and (2) being in thermal contact. The method is distinguished by the fact that, starting from a state in which the three chambers are at ambient temperature and at the same pressure:

in a first step, the chamber (1) is isolated and the chambers (EC) and (2) are brought into communication in order to carry out the exothermic synthesis in (2), the heat produced being absorbed by the chamber (1);

in a second step, the chamber (2) is isolated and the chambers (EC) and (1) are brought into communication in order to carry out the exothermic synthesis in (1), the heat produced being absorbed by the chamber (2); and in a third step, the three chambers are brought into communication and thermal energy is supplied to the chamber (1) in order to carry out the exothermic decomposition steps in (1) and in (2), for the purpose of regenerating the installation, which is then left to return to the ambient temperature.

DETAILED DESCRIPTION OF THE PREFERRED EMBODIMENTS

Figure 1:
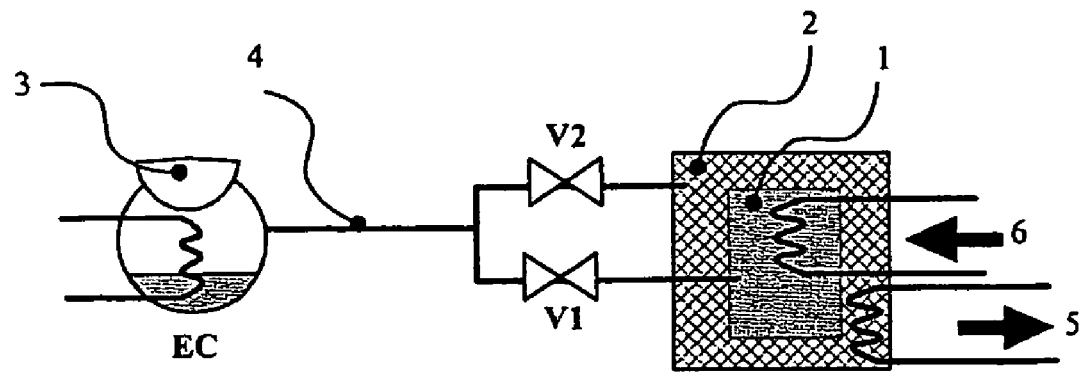
FIG. 1 is a diagram of an installation according to one embodiment of the present invention.

More precisely:

during a preliminary step, the three chambers are isolated from one another and placed at the ambient temperature, said chambers containing SEC+G, S1 and S2 respectively;

during a first step, the chambers (EC) and (2) are brought into communication, the chamber (1) remaining isolated, in order to carry out the exothermic synthesis in (2) and refrigeration in the chamber (EC) at the equilibrium temperature in (EC) corresponding to the pressure in the assembly formed by (2) and (EC);

during a second step, the chamber (2) is isolated and the chambers (EC) and (1) are brought into communication in order to carry out the exothermic synthesis in (1) and refrigeration in the chamber (EC) at the equilibrium temperature in (EC) corresponding to the pressure in the assembly formed by (1) and (EC);

during a third step, the three chambers are brought into communication in order to carry out the synthesis in (EC) and the decomposition in (2), and thermal energy is supplied to (1) in order to carry out the decomposition in (1); and during a fourth step, the three chambers are isolated and left to cool down to the ambient temperature.

The refrigeration cycle is thus complete.

The reversible phenomenon in the reactors (1) and (2) may be a reversible sorption chosen from reversible chemical reactions between the gas G and a solid, the adsorptions of the gas G on a solid, and absorptions of the gas G by a liquid.

The reversible phenomenon in the device (EC) may be a sorption, such as that defined above, or a liquid/gas phase change of the gas G. Liquid/gas phase changes are preferred as they allow refrigeration at a higher rate than with sorptions, because of the lower thermal inertia of the system.

In the rest of the text, "sorption" will denote a reversible sorption, the term "phenomenon" will denote a reversible phenomenon, chosen from sorptions and liquid/gas phase changes, the term "L/G change" will denote the liquid/gas phase change of the gas G, the terms "S1", "S2" and "SEC" will denote the sorbent in the gas-lean state or, where appropriate, G in the gaseous state, in the reactor (1), the reactor (2) and the device (EC) respectively, the terms "S1+G", "S2+G" and "SEC+G" will denote the sorbent in the gas-rich state or, where appropriate, G in the liquid state, in the reactor (1), the reactor (2) and the device (EC) respectively.

As an example of gas G, mention may be made of ammonia ($NH_3$) and its derivatives, hydrogen ($H_2$), carbon dioxide ($CO_2$), water ($H_2O$), hydrogen sulfide ($H_2S$), methane and other natural gases. As sorption reaction, mention may be made of reactions involving ammonium compounds (for example chlorides, bromides, iodides or sulfates), hydrates, carbonates or hydrides.

The method according to the present invention may be implemented using an installation that comprises an endothermic component, consisting of a device (EC), and an exothermic component, consisting of a reactor (1) and a reactor (2). Said installation is distinguished by the fact that:

the reactors (1) and (2) are in thermal contact so that each of them constitutes an active thermal mass for the other;

the reactors (1) and (2) and the device (EC) are provided with means for bringing them selectively into communication;

the reactor (1) and the reactor (2) are provided with heating means (6) and heat extraction means (5); and at the start of the cycle:

the reactors (1) and (2) contain a sorbent S1 and a sorbent S2, respectively, capable of participating in a reversible sorption involving a gas G, the equilibrium curve of the reversible sorption in (1) lying within a higher temperature range than that of the equilibrium curve of the reversible sorption in (2) in the Clausius-Clapeyron plot; and the device (EC) contains a compound G capable of undergoing a liquid/gas phase change or an SEC+G sorbent rich in gas G capable of participating in a reversible sorption, the equilibrium temperature of which is below the equilibrium temperature of the reversible sorption in the reactor (2).

In one particular embodiment, the thermal contact between the reactors (1) and (2) is achieved by placing the reactor (1) inside the reactor (2). For example, the reactors (1) and (2) may be concentric, the reactor (1) being placed inside the reactor (2).

In another embodiment, each of the reactors (1) and (2) is formed by several hollow plates containing the respective sorbents, plates of one of the reactors alternating with the plates of the other. The thickness of the plates is typically about 1 to 3 cm.

In an installation according to the invention, refrigeration takes place in the device (EC). If the refrigeration is intended for producing ice or chilled water, the installation furthermore includes a reservoir (3) containing water in direct thermal contact with the device (EC). If it is desired to produce ice, it is preferred to use a reservoir (3) divided into compartments having the size of the desired pieces of ice. When the installation is used to manufacture chilled water, the reservoir (3) may be a coil, incorporated into the wall of the device (EC), water flowing through said coil. If the installation is intended to freeze various products, the reservoir (3) has a suitable shape for containing and freezing the products correctly.

FIG. 1 shows a diagram of an installation according to the invention.

In this figure, the installation comprises a reactor (1), provided with heating means (6), a reactor (2), in thermal contact with the reactor (1) and provided with cooling means (5), a device (EC) and pipes provided with valves V1 and V2 for bringing the reactors (1) and (2) selectively into contact with (EC). The reactor (1) contains a sorbent S1 capable of undergoing sorption with a gas G. The reactor (2) contains a sorbent S2 capable of undergoing sorption with the gas G, the equilibrium temperature of S1 being above the equilibrium temperature of S2 at a given pressure. The device (EC) contains the gas G in the liquid state or a sorbent SEC capable of undergoing sorption with the gas G, the equilibrium temperature of SEC being below the equilibrium temperature of S2 and a given pressure. The device (EC) is advantageously an evaporator/condenser (noted hereinafter by evaporator) in which a liquid/gas (L/G) phase change takes place. (EC) is in direct thermal contact with a reservoir (3) incorporated into its wall and containing water.

Figure 2:
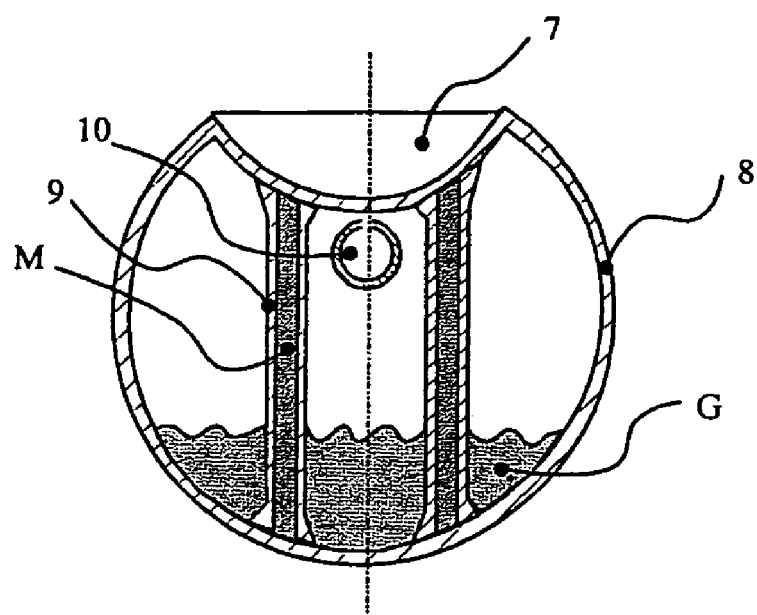
FIG. 2 shows a cross-sectional view of the installation of FIG. 1.
Figure 3:
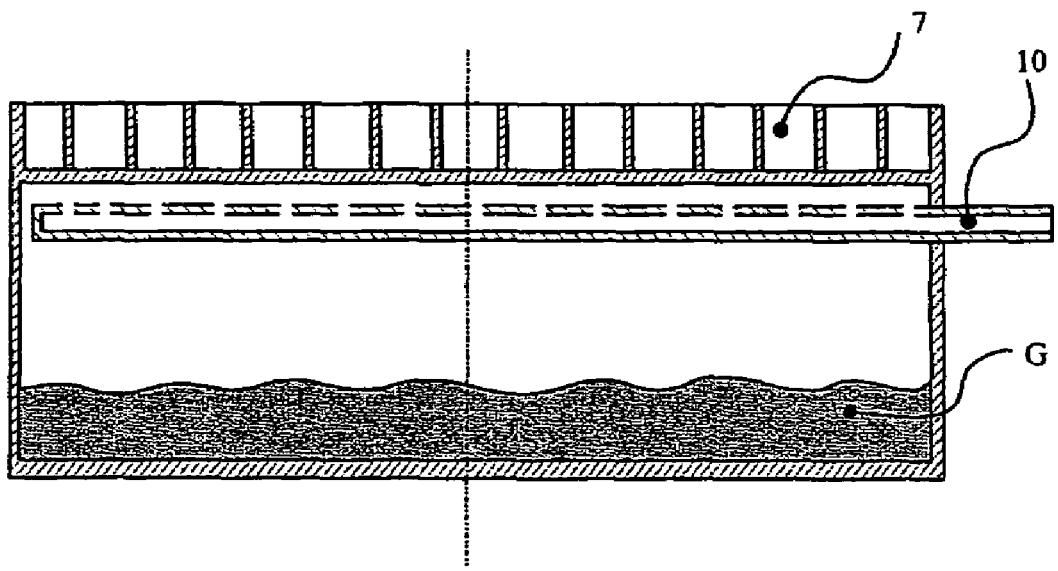
FIG. 3 shows a longitudinal sectional view of the installation of FIG. 1.

The installation and the method according to the invention are particularly advantageous when the device (2) is an evaporator/condenser (denoted hereinafter by evaporator). In one particular embodiment, the evaporator has a structure as shown in FIGS. 2 and 3. FIG. 2 shows a cross-sectional view and FIG. 3 shows a longitudinal sectional view.

The evaporator consists of a cylinder (8) which is closed at its two ends and has a circular cross section. The circular cross section includes, in its upper part, a concave circular arc corresponding to the cross section of the ice tray (7). Hollow fins (9) are placed inside the evaporator, in the longitudinal direction. A tube (10) connected to the pipe for transferring the gas G between the evaporator and the reactors (1) or (2) runs into the cylindrical chamber of the evaporator via a bore made in one of the ends of the cylinder, and it is placed directly beneath the wall of the ice tray (7). The working gas G, in the form of a boiling liquid, is placed in the bottom of the evaporator. The space between the walls of the fins is occupied by the phase change material M.

The outer wall of the evaporator (8) is made of a material having a high thermal diffusivity, that is to say a low thermal capacity in order to allow the wall temperature to drop rapidly and a high thermal conductivity in order to allow rapid ice formation. A material, for example based on aluminum, which has a low thermal capacity and a high conductivity, is suitable because of its compatibility with ammonia, which is a gas frequently used in negative-temperature refrigeration installations. The fins (9) increase the diffusion of heat, from the boiling liquid into the ice tray, and the mechanical strength of the evaporator. The ice tray 7 is provided with many transverse partitions placed so as to obtain the desired shape of the pieces of ice. The overall shape of the ice tray has a suitable toroidal half-moon shape, thereby allowing easy demolding of the pieces of ice formed.

The phase change material M placed between the walls of the hollow fins maintains the temperature of the evaporator at a low temperature. This makes it possible to extend the ice production step during the transient heating step for regenerating the reactor isolated from the evaporator.

The particular configuration of the tube (10) and its position in the chamber of the evaporator are such that the hot gases, coming from the reactor during the step 5 of bringing the high-pressure reactor into communication with the evaporator maintained at low pressure by the phase change material, firstly strike the wall of the ice tray, which makes it easier to separate the pieces of ice.

In one particular embodiment, the method of refrigeration according to the invention is implemented using an installation as described above, in which the chamber (EC) furthermore contains a solid/liquid phase change material M. The phase change material M is chosen in such a way that the solidification temperature is at least slightly below the temperature of refrigeration in (EC) corresponding to the synthesis in (2). A temperature difference of a few degrees, for example from 1° C. to 10° C., is appropriate. For example, this temperature is 0° C. when the desired objective is to manufacture ice. Material M may be chosen, for example, from paraffins, such as n-alkanes having from 10 to 20 carbon atoms, eutectic mixtures and eutectic solutions. The process takes place in the same manner as in the general case described above. However, during the regeneration step, the temperature in the chamber (EC) is that of the melting point of the material M, resulting in a regeneration temperature which is less than that occurring in the absence of the change of phase material. This alternative way of implementing the method of the invention consequently reduces the cycle time and the amount of energy required for regeneration.

The implementation of the method of the invention in an installation according to the invention is described in greater detail below with reference to FIGS. 4 to 7 in the case of an installation in which (EC) is an evaporator/condenser. FIGS. 4 to 7 show the position of the installation in the Clausius-Clapeyron plot during the various steps of an operating cycle. The curves in the plots correspond to monovariant phenomena. The operation of the installation would, however, be identical if a divariant phenomenon, corresponding for example to the absorption of the gas G by an absorbent solution (for example water/$NH_3$ or water/LiBr) or to the adsorption of the gas G on the surface of an active solid (for example active carbon or zeolite), were to be used in the reactors (1) and/or (2).

Initial Step:

During an initial step, the components (1), (2) and (EC) are placed at the ambient temperature $T_0$ and isolated from one another by keeping the valves V1 and V2 closed. Since the components are isolated from one another, they are at their respective equilibrium pressures at $T_0$, denoted by $PE^0$, $P1^0$ and $P2^0$. The reactors (1) and (2) contain S1 and S2 respectively while the device (EC) contains G in liquid form. S1, S2 and G are chosen in such a way that $P1^0 < P2^0 < PE^0$. The situation of the components is shown by $1^0$, $2^0$ and $E^0$ in the plot shown in FIG. 4.

Step 1: First Refrigeration Step

Figure 4:
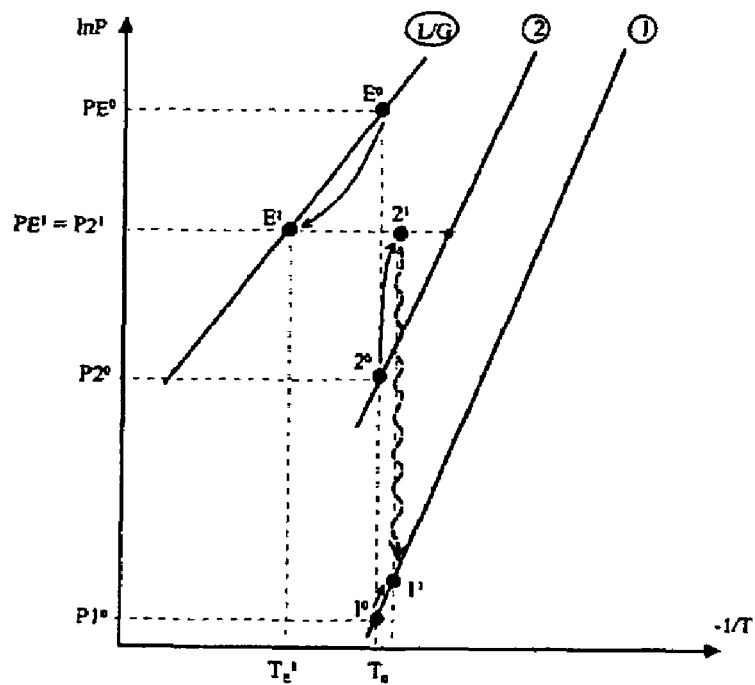
FIGS. 4-7 graphically depicts a Clausius-Clapeyron plot for the installation during the various steps of an operating cycle.

The valve V1 remains closed and the installation operates by means of the reactor (2) and the evaporator (EC). Opening the valve V2 equalizes the pressure ($PE^1 = P2^1$) between (EC) and (2). The evaporator (EC) passes from the position $E^0$ to $E^1$ and the reactor (2) from the position $2^0$ to $2^1$. The change in the respective positions is shown in FIG. 4. In the $2^1$ state, the reactor (2) is in synthesis position, whereas in the $E^1$ state the evaporator (EC) is in the evaporation state. Bringing (EC) into communication with (2) causes a sudden drop of temperature in (EC) and the temperature passes from $T_0$ to $T_{E1}$. This temperature drop thus firstly allows rapid freezing of the water contained in a tray (not shown in FIG. 1) incorporated into the wall of the evaporator. A first refrigeration power peak is then observed. The gas liberated by the evaporation in (EC) is absorbed by the sorbent S2 contained in (2), causing a temperature rise in the reactor (2) owing to the fact that the sorption is highly exothermic. The energy produced by the sorption in (2) is absorbed by the reactor (1), which is isolated from (EC) but in thermal contact with (2). The reactor (1) therefore constitutes a thermal capacitance allowing the reactor (2) to remain far apart from its thermodynamic equilibrium. The reactor (1) then passes from the position $1^0$ to the position $1^1$ by remaining on its thermodynamic equilibrium line.

Step 2: Second Refrigeration Step

Figure 5:
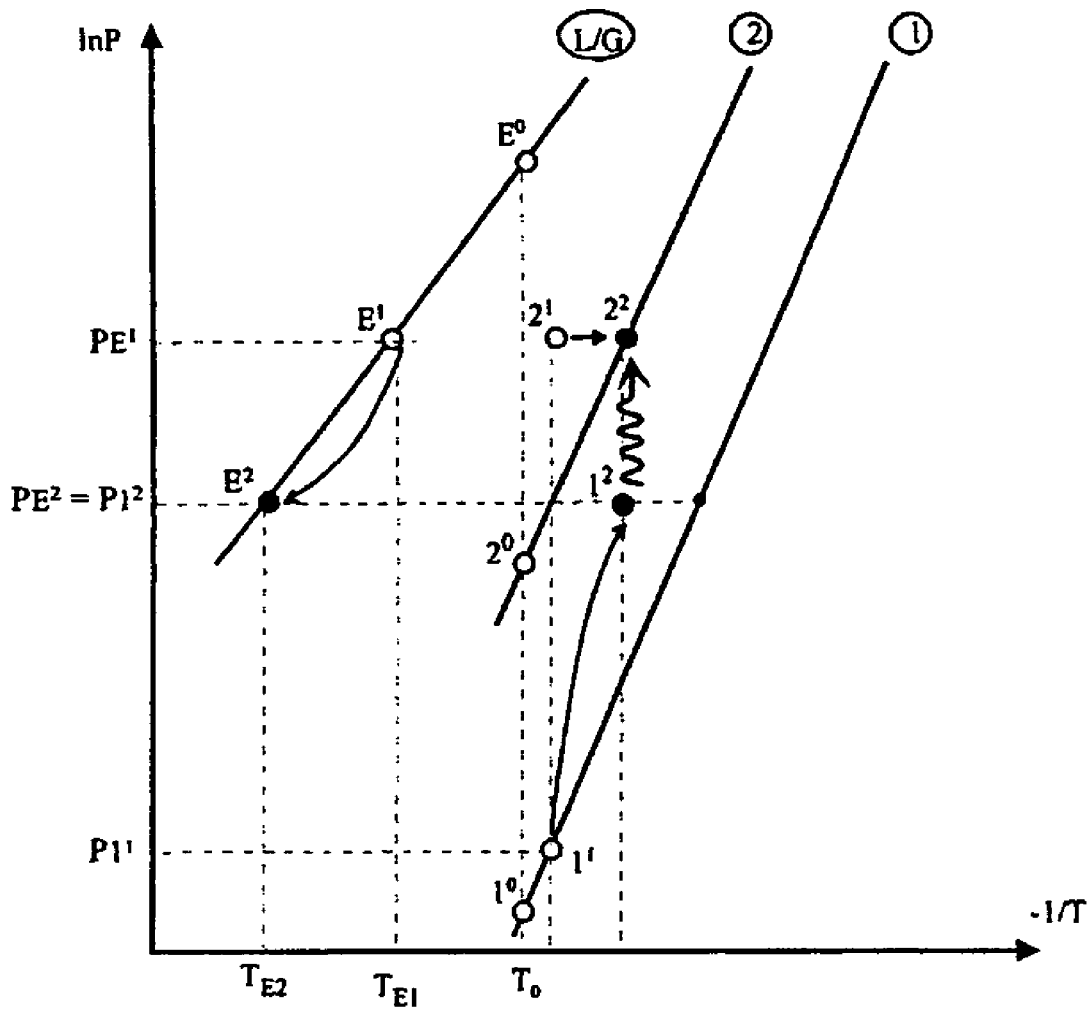

When synthesis has been completed in the reactor (2) at the end of step 1 [the duration of which is determined by the nature and the quantities of the elements used in (2) and (EC)], the valve V2 is closed and the valve V1 immediately opened. The installation then operates by means of the reactor (1) and the evaporator (EC). The equilibrium pressure that is established between the reactor (1) and the evaporator (EC) makes these components pass from the positions shown by $E^1$ and $1^1$ to the positions shown by $E^2$ and $1^2$. This change is shown in FIG. 5.

Refrigeration takes place in the evaporator (EC) at $E^2$, that is to say at a temperature $T_{E2}$ below the refrigeration temperature $T_{E1}$ in step 1. Since steps 1 and 2 take place one after the other, they give high levels of refrigeration power at $T_{E2}$, driving (EC) only from $T_E^1$ to $T_E^2$. During this step, the reactor (2) acts as a thermal capacitance for the reactor (1). The reactor (2), which absorbs the exothermic reaction heat coming from the reactor (1), rises in temperature and is at $2^2$ on its thermodynamic equilibrium line. Thanks to this thermal capacitance, the reactor (1) remains at $1^2$, which is a position far from its thermodynamic equilibrium. This results in a strong, second refrigeration power peak.

Step 3: Ice-Separation and Regeneration Step

At or before the end of step 2, valve V2 is opened, the valve V1 remaining open.

Figure 6:
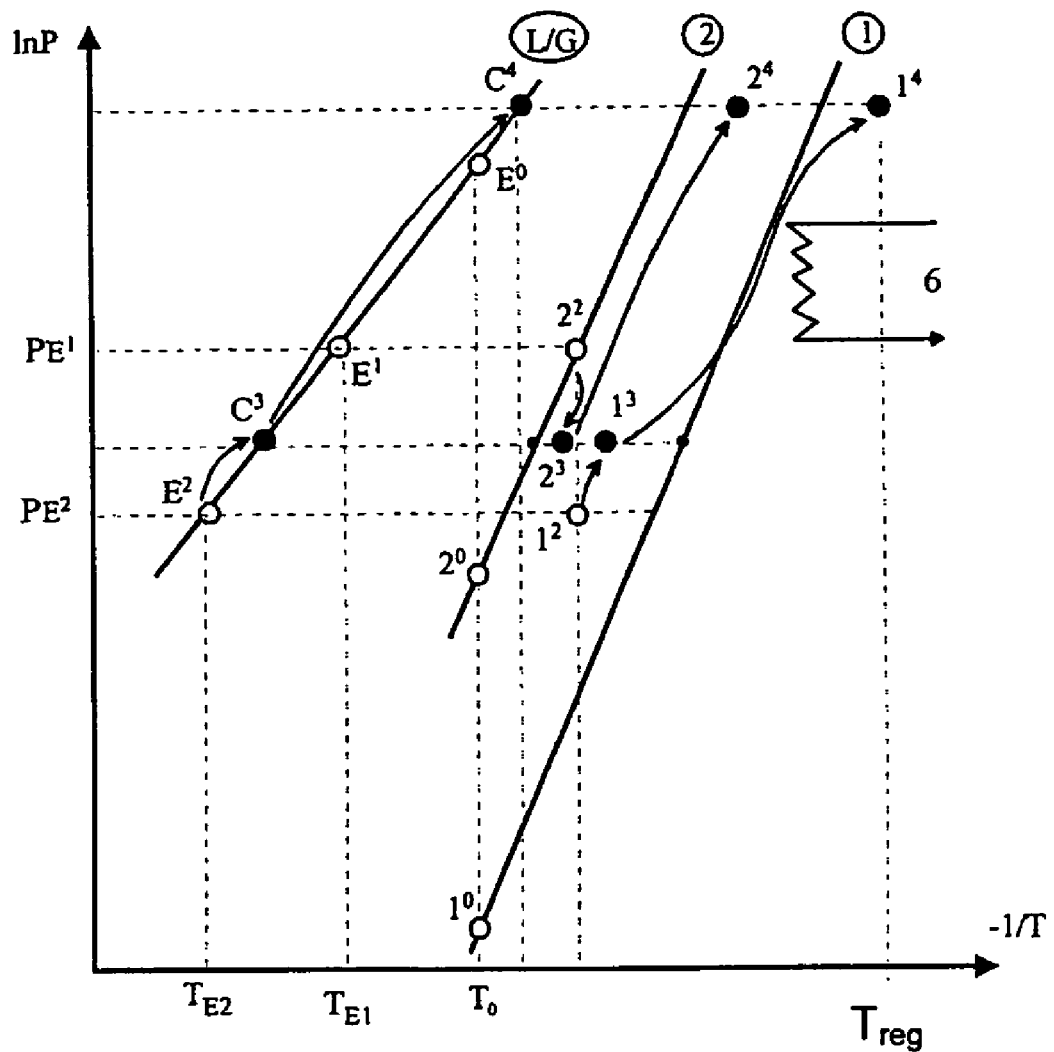

The components (1), (2) and (EC) move rapidly to positions $1^3$, $2^3$ and $C^3$ at an intermediate pressure level between that of step 1 and step 2. The contents of the reactor (2) are in the decomposition position and the contents of the reactor (1) remain in the synthesis position. These synthesis/decomposition positions remain far from equilibrium because of the thermal contact that exists between the reactors (1) and (2). The result is that the decomposition in the reactor (2) is more rapid than the synthesis that emanates in the reactor (1). Thus, condensation is immediately initiated in the device (EC), which moves rapidly to the position $C^3$. This exothermic condensation is possible as the heat is absorbed by the surface melting of the pieces of ice, causing them to separate and thus making it easier to subsequently remove them from the device (EC). Turning the heating means (6) on in (1) right from the start of this step (at the same time as the valve V2 is opened) results in condensation in (EC), which progressively moves from the position $C^3$ to a pressure level $C^4$ that again allows the gas G to condense. Condensation is again possible when the reactor (1) is in the position $1^4$ and when the condensation pressure becomes greater than the saturation vapor pressure corresponding to the mean temperature of the cooling fluid of the element (EC) (for example that of the external air). The temperature $T_1^4$ is the regeneration temperature ($T_{reg}$) and the device (EC) is in the position $C^4$, which moves the reactor (2) to the position $2^4$ also at the pressure level imposed by the condensation. The thermodynamic position $C^4$ is then necessarily such that the temperature corresponding to the position $C^4$ is above the ambient temperature $T_0$, because the heat of condensation is transferred to the heat sink. The regeneration of the device means that the heat of this exothermic condensation must be extracted from a heat sink, which may be the ambient air or a cooling circuit. The change in the position of the various components is shown in FIG. 6.

Step 4: Cooling Step and Return to the Initial Step

Figure 7:
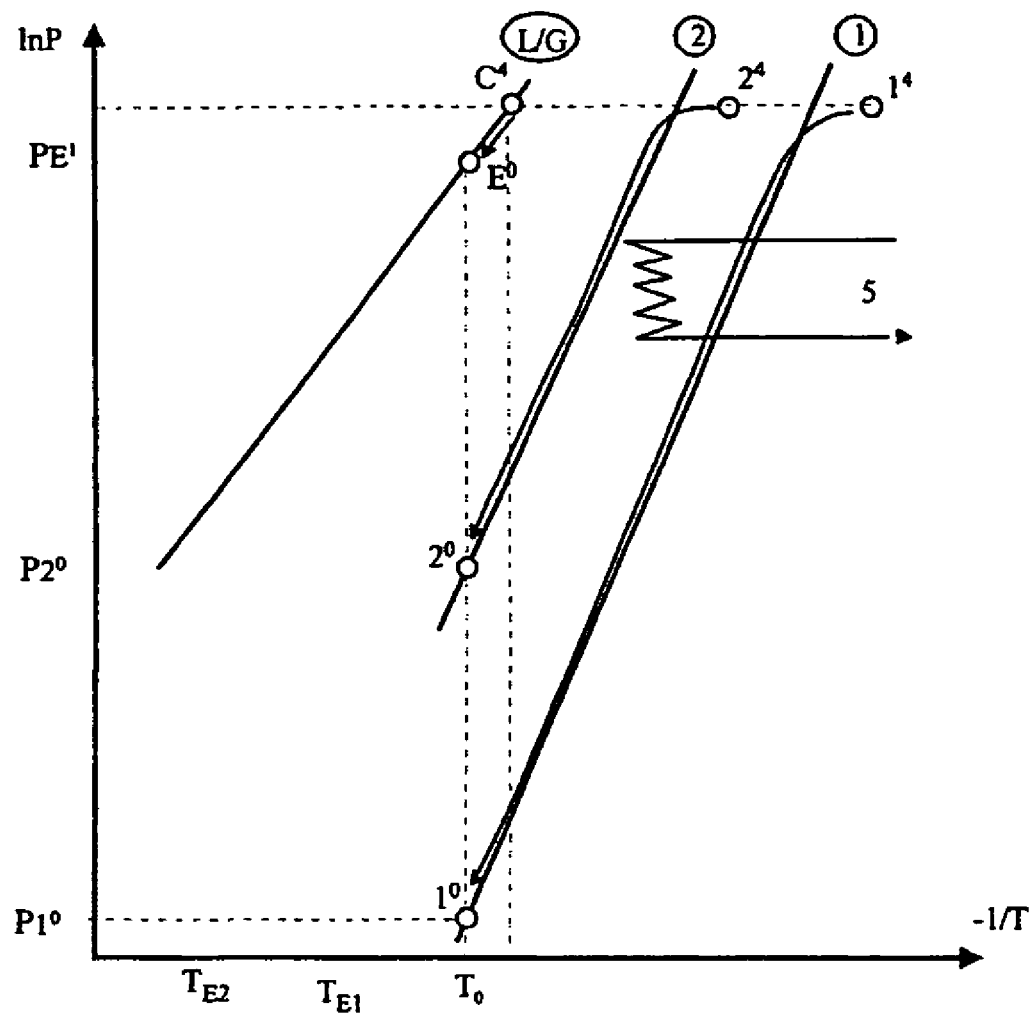

Once the regeneration of the reactors (1) and (2) has been completed, the valves V1 and V2 are closed. The reactors thus isolated are then cooled, either naturally or using cooling means (5) (fan, cooling circuit, etc.), lowering the temperature and the pressure. Each component moves along its thermodynamic equilibrium curve until it reaches the ambient temperature and thus returns to the initial position, $E^0$, $1^0$ and $2^0$ respectively. The device is thus under the initial conditions of the refrigeration storage step at the start of the operating cycle. The change in position of the various components during this step is shown in FIG. 7.

Figure 8:
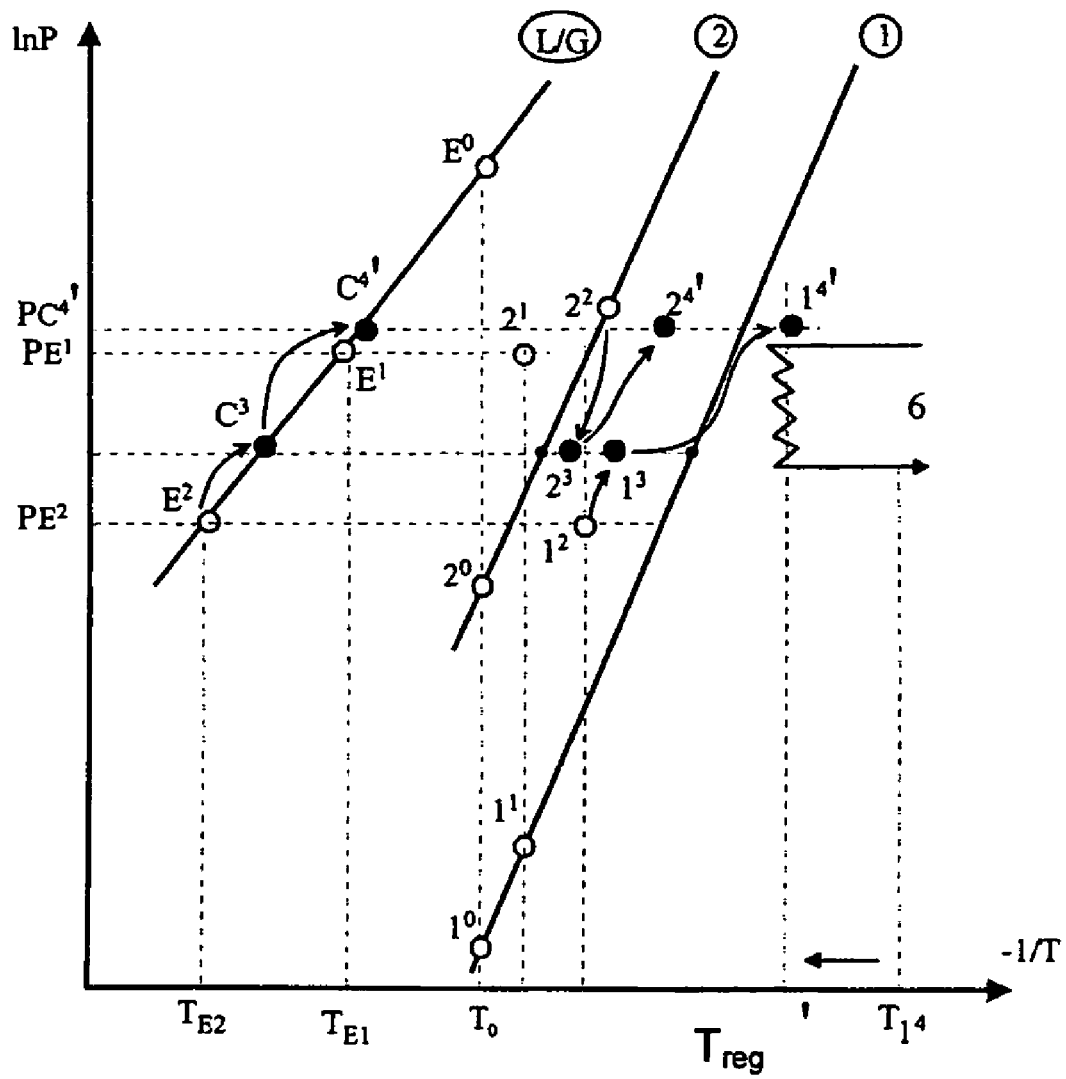
FIG. 8 graphically depicts a Clausius-Clapeyron plot for the successive states of the reactors and chamber of the installation.

When the method of the invention is employed with an installation in which the chamber (EC) furthermore includes a phase change material M, the phase change temperature $T_M$ of which is at least slightly below the refrigeration temperature $T_{E1}$ in (EC) corresponding to synthesis in (2), the regeneration of the sorbents contained in the reactors (1) and (2) is more rapid. The successive states in which the reactors (1) and (2) and the chamber (EC) are found during the successive steps are illustrated in the Clausius-Clapeyron plot shown in FIG. 8. In this embodiment, the device (EC) may have the configuration shown in FIGS. 2 and 3.

Initial Step:

This is similar to the initial step described above. The components (1), (2) and (EC) are in the positions shown by $1^0$, $2^0$ and $E^0$ in FIG. 8.

Step 1: First Refrigeration Step

The valve V1 remains closed. The installation operates by means of the reactor (2) and the evaporator (EC). Opening the valve V2 equalizes the pressure ($PE^1=P2^1$) between (EC) and (2). The evaporator (EC) passes from the position $E^0$ to $E^1$ and the reactor (2) passes from the position $2^0$ to $2^1$. In the $2^1$ state, the reactor (2) is in the synthesis position, while in the $E^1$ state the evaporator (EC) is in the evaporation state.

Bringing (EC) into communication with (2) causes a sudden drop in the temperature (EC), which passes from $T_0$ to $T_{E1}$. This temperature drop thus firstly results in rapid cooling and then partial freezing of the water contained in the tray 7 incorporated into the wall of the evaporator, then solidification of the material M. The gas released by the evaporation in (EC) is absorbed by the sorbent S2 contained in (2), which results in a temperature rise in the reactor (2) because the sorption is highly exothermic. The energy produced by the sorption in (2) is absorbed by the reactor (1), which is isolated from (EC) but in thermal contact with (2). The reactor (1) therefore constitutes a thermal capacitance allowing the reactor (2) to remain far from its thermodynamic equilibrium. The reactor (1) then passes from the position $1^0$ to the position $1^1$, remaining on its thermodynamic equilibrium line.

Step 2: Second Refrigeration Step

The presence of a phase change material in (EC) does not modify the execution of step 2. After this step, the reactors (1) and (2) and the chamber (EC) are in the respective positions $1^2$, $2^2$, $E^2$.

Step 3: Ice Separation and Regeneration Step

After step 2, the valve V2 is opened, the valve V1 remaining open.

The components (1), (2) and (EC) move rapidly to the positions $1^3$, $2^3$ and $C^3$ at an intermediate pressure level between that of step 1 and step 2. The contents of the reactor (2) are in the decomposition position and the contents of the reactor (1) remain in the synthesis position. These synthesis/decomposition positions remain far from equilibrium, because of the thermal contact that exists between the reactors (1) and (2). As a result, the decomposition in the reactor (2) is more rapid than the synthesis that is completed in the reactor (1). Thus, condensation is immediately initiated in the device (EC), which moves rapidly to the position $C^3$. This exothermic condensation is possible since the heat is absorbed by the surface melting of the pieces of ice, causing them to separate and thus making it easier for them to be subsequently removed from the device (EC). Turning the heating means (6) on in (1) right from the start of this step (at the same time as opening the valve V2) maintains the condensation in (EC), which continues to move progressively from the position $C^3$ to the position $C^{4'}$, again allowing gas to condense effectively. Condensation is again possible when the reactor (1) is in the position $1^{4'}$ and when the condensation pressure becomes greater than the saturation vapor pressure corresponding to the melting point $T_M$ of the phase change material. The temperature $T_1^{4'}$ is the regeneration temperature ($T_{reg}$) and the device (EC) is in the position $C^{4'}$, which takes the reactor (2) to the position $2^{4'}$, again at this pressure level imposed by condensation of the gas G.

Opening valve V2 (the valve V1 remaining open) and turning on the heating means (6) in the reactor (1) triggers rapid desorption in the reactor (2), separation and removal of the ice, and the end of the synthesis in the reactor (1) followed by desorption in (1). The condensation temperature imposed at the temperature $T_M$ by the melting of the eutectic makes it possible, on the one hand, to condense the gas G at a temperature below the ambient temperature. This allows the thermal excursion of the device (EC) to be substantially reduced, resulting in better efficiency of the method and shorter cycle times. On the other hand, the condensation pressure $P_{C4'}$ is lower than the pressure $P_{C4}$ obtained in the case without a phase change material. This results in a decrease in the regeneration temperature of (1), and consequently that of (2), which means a reduction in the energy consumed in regenerating (1) and (2), again resulting in a better efficiency of the method and a reduction in the cycle times.

Step 4: Cooling Step and Return to the Initial Step

The entire installation returns to the temperature $T_0$ in a shorter time if a phase change material is present, because the reactor (1) is at a lower temperature.

The installation according to the invention in its most general configuration, operated according to the method of the invention, thus makes it possible to achieve powerful refrigeration in very short times, which can allow the almost instantaneous production of ice for example. Furthermore, when the installation contains a phase change material in the endothermic component, the regeneration temperature in the reactor operating at the highest temperature is reduced, which on the one hand shortens the duration of the process and reduces the power consumption.

The invention claimed is:

1. An installation for refrigeration comprising an endothermic component comprised of a device (EC) and an exothermic component comprising a reactor (1) and a reactor (2), wherein:
   the reactors (1) and (2) are in thermal contact so that the reactor (1) constitutes a first active thermal mass for the reactor (2) and the reactor (2) constitutes a second active thermal mass for the reactor (1);
   the reactors (1) and (2) are selectively communicating with the device (EC);
   the reactor (1) and the reactor (2) are provided with a heater and a heat extractor;
   at the start of a cycle the reactor (1) comprises a sorbent S1 and the reactor (2) comprises a sorbent S2, the sorbent S1 participating in a first reversible sorption involving a gas G and the sorbent S2 participating in a second reversible sorption involving the gas G, a first equilibrium temperature of the first reversible sorption in the reactor (1) being higher than a second equilibrium temperature of the second reversible sorption in the reactor (2) at a given pressure; and
   the device (EC) is an evaporator, the evaporator being comprised of a cylinder which is closed at its two ends and has a circular cross section, the circular cross section including, in its upper part, a concave circular arc corresponding to the cross section of an ice tray, wherein the evaporator further comprises:
   i) hollow fins comprising a solid/liquid phase change material; and
   ii) a tube, connected to a pipe transferring the gas G between the evaporator and the reactor (2), extending into the cylinder of the evaporator via a bore made in one of the ends of the cylinder, the tube being placed directly beneath a wall of the ice tray, and the gas G in the form of a boiling liquid being placed in the bottom of the evaporator.

2. The installation as claimed in claim 1, wherein the device (EC) is in direct thermal contact with a reservoir containing water.

3. The installation as claimed in claim 1, wherein the solid/liquid phase change material has a phase change temperature below a refrigeration temperature of the installation.

4. The installation as claimed in claim 1, wherein the reactor (1) is placed inside the reactor (2).

5. The installation as claimed in claim 4, wherein the reactors (1) and (2) are concentric.

6. The installation as claimed in claim 3, wherein the difference between the phase change temperature of the solid/liquid phase change material and the refrigeration temperature is from 1° C. to 10° C.

7. A method of refrigeration using the installation of claim 1, further comprising three reversible phenomena involving the gas G in the device (EC), the reactor (1) and the reactor (2) having respective equilibrium temperatures $T_{E(EC)}$, $T_{E(1)}$ and $T_{E(2)}$ at the given pressure such that $T_{E(EC)} < T_{E(2)} < T_{E(1)}$, wherein, starting from an initial state in which the device (EC), the reactor (1) and the reactor (2) are at ambient temperature and at a same pressure:
   (a) in a first step, isolating the reactor (1), carrying out a first exothermic synthesis in the reactor (2) by bringing the device (EC) and the reactor (2) into communication, and absorbing heat produced by the first exothermic synthesis with the reactor (1);
   (b) in a second step, isolating the reactor (2), carrying out a second exothermic synthesis in the reactor (1) by bringing the device (EC) and the reactor (1) into communication, and absorbing heat produced by the second exothermic synthesis with the reactor (2); and
   (c) in a third step, bringing the device (EC), the reactor (1), and the reactor (2) into communication, regenerating the installation by carrying out exothermic decomposition steps in the reactor (1) and the reactor (2) by supplying thermal energy to the reactor (1), and allowing the installation to return to the ambient temperature.

8. The method as claimed in claim 7, further comprising:
   in the initial state, isolating the device (EC), the reactor (1) and the reactor (2) from one another and placing the device (EC), the reactor (1) and the reactor (2) at the ambient temperature, wherein the reactor (1) comprises the sorbent S1 in a state lean in the gas G, the reactor (2) comprises the sorbent S2 in a state lean in the gas G, and the device (EC) comprises the gas G in a liquid state or a sorbent in a state rich in the gas G;
   during the first step, causing refrigeration in the device (EC) by bringing the device (EC) and the reactor (2) into communication, wherein the refrigeration occurs at an equilibrium temperature in the device (EC) corresponding to the pressure in a first assembly formed by the reactor (2) and the device (EC);
   during the second step, causing refrigeration in the device (EC) by bringing the device (EC) and the reactor (1) into communication, wherein the refrigeration occurs at the equilibrium temperature in the device (EC) corresponding to the pressure in a second assembly formed by the reactor (1) and the device (EC); and
   during the third step, causing synthesis in the device (EC) and decomposition in the reactor (2) by bringing the device (EC), the reactor (1) and the reactor (2) into communication, and causing decomposition in the reactor (1) by applying thermal energy to the reactor (1).

9. The method as claimed in claim 7, wherein the reversible phenomena in the reactors (1) and (2) are selected from the group consisting of reversible chemical reactions between the gas G and a solid, adsorptions of the gas G on a solid, and absorptions of the gas G by a liquid.

10. The method as claimed in claim 7, wherein the reversible phenomenon in the device (EC) is a liquid/gas phase change.

11. The method as claimed in claim 7, wherein the reversible phenomenon in the device (EC) is a sorption selected from the group consisting of reversible chemical reactions between the gas G and a solid, adsorptions of the gas G on a solid, and absorptions of the gas G by a liquid.

* * * * *